United States Patent [19]

Drury et al.

[11] 4,312,152
[45] Jan. 26, 1982

[54] BUOYANT SUPPORT STRUCTURE AND SYSTEM AND METHOD USING STRUCTURE FOR WATER CULTURE OF PLANTS

[75] Inventors: Daniel Drury, Gorham, N.H.; Geoffrey Drury, Canaan; G. Graham Davidson, Jr., Lakeville, both of Conn.

[73] Assignee: Agrownautics, Inc., Salisbury, Conn.

[21] Appl. No.: 157,696

[22] Filed: Jun. 9, 1980

[51] Int. Cl.³ .................................................. A01G 31/02
[52] U.S. Cl. .......................................... 47/63; 47/62; 47/87
[58] Field of Search ............................. 47/59–65, 47/84–87, 73, 77

[56] References Cited

U.S. PATENT DOCUMENTS

| | | | |
|---|---|---|---|
| 1,057,877 | 4/1913 | Peeples | 47/85 X |
| 2,175,113 | 10/1939 | Fischer | 47/59 |
| 2,189,510 | 2/1940 | Swaney | 47/59 |
| 2,988,441 | 6/1961 | Pruitt | 47/DIG. 7 |
| 3,579,907 | 5/1971 | Graves | 47/65 X |
| 3,667,159 | 6/1972 | Todd | 47/87 |
| 3,798,836 | 3/1974 | Rubens | 47/59 |
| 3,810,329 | 5/1974 | Lecuru et al. | 47/87 |
| 3,927,491 | 12/1975 | Farnsworth | 47/63 |
| 4,028,847 | 6/1977 | Davis et al. | 47/65 |
| 4,034,506 | 7/1977 | Kasahara et al. | 47/64 |
| 4,075,785 | 2/1978 | Jones | 47/64 |
| 4,166,341 | 9/1979 | Vestergaard | 47/59 |

FOREIGN PATENT DOCUMENTS

| | | | |
|---|---|---|---|
| 241896 | 12/1964 | Austria | 47/63 |
| 7406925 | 11/1975 | Netherlands | 47/87 |
| 1278529 | 6/1972 | United Kingdom | 47/87 |

*Primary Examiner*—Robert E. Bagwill
*Attorney, Agent, or Firm*—Kenyon & Kenyon

[57] ABSTRACT

A support structure for growing plants such as lettuce by hydroponic cultivation includes a buoyant, closed cell, foamed plastic pallet having an array of spaced integral punch-out plugs arranged preferably in staggered rows. Selected patterns of plugs are removed to permit insertion of plants growing in porous seed blocks into the resulting holes, the patterns having different spacings depending on the size of the plants. Blocking members prevent the plants from falling through the holes when the pallets float on liquid nutrient solution in a trough and also space the pallets above the bottom of the trough for access of air to the plant roots when the trough is periodically drained. When plants outgrow one selected spacing pattern, they are readily and precisely transferred to another pallet having a selected pattern of greater spacing. When the plants are ready for harvesting, the pallets with mature plants in them can be carried to a packaging area.

19 Claims, 10 Drawing Figures

BUOYANT SUPPORT STRUCTURE AND SYSTEM AND METHOD USING STRUCTURE FOR WATER CULTURE OF PLANTS

BACKGROUND OF THE INVENTION

1. Field of the Invention

The present invention relates to systems for soil-less cultivation of plants in water and particularly to systems for growing plants on a buoyant structure which can float on an aqueous nutrient solution.

2. Description of the Prior Art

A commercially feasible system for hydroponic cultivation of plants, particularly when incorporated in a comprehensive system of controlled environment agriculture, must meet a number of requirements to be competitive with conventional growing methods. Because of the high capital investment and operating costs per unit of growing area associated with such systems, optimum utilization of available space for the highest possible density growing is essential. The concept of variable plant spacing—allowing each plant, as it develops, only as much space as it actually needs at each particular stage of growth—is one of the most important elements of such high density growing, particularly in the case of fast growing crops of relatively low unit value such as lettuce. Hydroponic techniques have now been developed that permit plants to be grown successfully in individual seed blocks, without the use of a continuous rooting medium of any kind, thus making possible free respacing of the growing plants as they mature. Such respacing tends, however, to be labor intensive and difficult to regulate precisely. It also leads to problems in providing adequate support for individual plants and in maintaining the light-tight shielding of nutrient solutions around the plants that is desirable for control of algae in hydroponic growing systems.

In addition, liquid nutrient solution supplied to the individual seed blocks must be replenished, either continuously or periodically. The resulting flow tends to shift the growing blocks from their originally set positions within the troughs or beds of the hydroponic system. It also is difficult to regulate the liquid nutrient depth such that plant roots are kept moist but the stems are not flooded.

The problems of plant spacing and plant support are considered in U.S. Pat. No. 3,927,491, issued to R. S. Farnsworth on Dec. 23, 1975. Farnsworth discloses a process for growing plants, such as lettuce, by supporting each plant on an individual "raft" floating on a nutrient solution. At the seedling stage, a group of small individual rafts may be connected together by frangible means. When the plants grow larger, the small rafts can be separated by breaking the frangible separators. The small rafts are then placed on larger rafts, which not only maintain a greater spacing between the plants but also are able to support the increased weight of the maturing plants. The rafts may be made of a buoyant material, such as polystyrene foam, cork, or the like.

As the plants continue to grow, they start to push apart the adjacent rafts. This allows light to reach the nutrient solution, an undesirable situation because it accelerates the growth of algae. It is also difficult to have a stable raft for each plant without making the rafts undesirably large, and individual rafts are not efficient from a materials handling standpoint.

Other patents have been issued relating to floating plant supports. For example, composite foam slabs floated on a nutrient solution in a large pan have been used for growing bean plants from seed, according to the disclosure in U.S. Pat. No. 3,798,836 of L. C. Rubens et al. Another method of hydroponic cultivation using buoyant plastic trays carrying grass plants on a nutrient stream flowing through a horizontal closed loop pipe is described in U.S. Pat. No. 3,579,907 of R. J. Graves. T. Kasahara et al. describe in U.S. Pat. No. 4,034,506, a porous buoyant plate consisting of foamed plastic beads bonded to each other, with water permeable spaces formed between the beads, for use as a hydroponic plant growing support. None of these latter patents is concerned, however, with changing the spacing of the plants as they grow, other than by traditional thinning.

The use of floating plant supports normally presents a problem with respect to supplying oxygen to the plant roots, so that some type of aeration system for the nutrient liquid is ordinarily required. On the other hand, both oxygen and liquid nutrient can be supplied readily to plants in non-floating supports. In U.S. Pat. No. 2,189,519 of M. W. Swaney, for example, plants are set in individual split-cork supports placed in spaced holes in the lid of a water-tight box or tank. Liquid nutrient partially fills the box, so that air can reach the roots in the space between the underside of the lid and the liquid surface. Unused holes in the lid may be plugged by solid corks to prevent light from entering the nutrient chamber. A different approach is followed by J. L. Jones in U.S. Pat. No. 4,075,785, which discloses a hydroponic growing system for lettuce in which individual plants are grown from seeds placed in individual growing blocks supported in fixed spaced relation in gravel beds, on A-frames, or by chicken wire stretched over inclined troughs. Liquid nutrient solution is periodically supplied to the plants by flooding or spraying. The plant roots are thus exposed to air during the intervals between nutrient applications.

SUMMARY OF THE INVENTION

It is an object of the present invention to provide a buoyant support structure for a plurality of plants on which plant spacing can be varied in a series of predetermined steps, yet which shields the underlying nutrient solution and the plant roots from direct light under all plant spacing conditions.

A further object is to provide a structure that positions the plants precisely at the preselected spacings, supports each plant in its seed block in an upright position, regulates the depth to which the seed block is immersed in the nutrient solution, provides ready access for oxygen to the plant roots, and permits the rapid handling and movement of large groups of plants as single units, either on the surface of or independent of the nutrient solution.

Another object of the invention is to provide a complete system incorporating the buoyant support structure and also a method for use with the system to supply both nutrient and oxygen in optimum amounts to the plant roots simply and automatically.

These and other objects are achieved by a support structure comprising a lightweight panel-like pallet adapted to buoyantly support regularly spaced arrays of plants at various predetermined spacings corresponding to advancing growth stages, one face of the pallet being adapted to serve as a top surface and the opposite face as a bottom surface, the pallet including an array of integral punch-out plugs formed from the material of the pallet and arranged in a multiplicity of equally spaced rows, the cross-sectional size of the plugs being predetermined to permit easy insertion and withdrawal of seed blocks into and from holes in the pallet which result from removal of the plugs, whereby selected plugs of the array, spaced apart according to the size of plants at a given growth stage, can be removed for insertion of such plants into the resulting holes.

The pallet is preferably rectangular and preferably is made of closed cell foamed plastic material, such as polyethylene. The plugs in each row are preferably equally spaced and staggered with respect to the plugs in the next adjacent row.

The plant support structure of the invention further comprises means positioned adjacent to the bottom surface of the pallet for partially blocking the holes remaining after removal of selected ones of the punch-out plugs, to prevent dropping of seed blocks through such holes while permitting free access by roots of plants in such seed blocks to liquid nutrient contacting the bottom surface of the pallet. The blocking means may comprise an elongated member such as an acrylic rod, the member having a diameter substantially smaller than the diameter of the punch-out plugs and having a length extending the full distance of one of the rows of plugs, together with means for attaching the member adjacent to the bottom surface of the pallet in line with such row of plugs. Alternatively, the blocking means may comprise an open mesh grid member, the mesh opening being smaller than the plug holes and the size of the grid member being large enough to cover the array of punch-out plugs, together with means for fastening the grid member against the bottom surface of the pallet.

The invention also provides a system for using the buoyant support pallets for hydroponic growing of plants. In the system, at least one and preferably a large number of the support pallets are disposed in a shallow water-tight container, the pallets fitting loosely within the container to substantially cover its area. The system includes means for supplying fresh liquid nutrient solution to the container sufficient to float the pallets and means for draining liquid nutrient from the container. Preferably the nutrient is circulated periodically from and returned to a reservoir, so that the pallets float in the nutrient for a specific period of time and then the nutrient is drained from the container, thereby exposing the plant roots to the air in the space beneath the pallets. This avoids the need for oxygenating the nutrient solution.

For large scale growing operations, a number of elongated, rectangular, flat-bottomed, trough-like containers are used disposed side by side, each trough containing a number of rows of pallets. For optimum space utilization, the troughs are desirably positioned close together. Under some circumstances it is advantageous to rely upon the ability of the pallets to float on the surface of the nutrient-filled troughs for purposes of moving and gaining access to individual pallets or groups of pallets. In such circumstances fixed troughs without aisles between them may be desirable.

In many situations, however, it is preferable to provide access space between troughs. To provide such access, the troughs are supported on means which permit lateral movement of each trough perpendicular to its longitudinal axis. A preferred support means consists of at least two spaced support members or rails extending transversely under each trough and a pair of cylindrical rollers positioned across the rails under each trough, the rollers extending parallel to the trough axis. This arrangement provides a simple, low friction, movable support structure.

Finally, the invention involves a method of hydroponic growing of plants which includes initially placing a seed in each one of a number of seed blocks arranged in a closely packed array and supplying liquid nutrient and light to the array of blocks for germinating the seeds and growing them to a first predetermined growth stage. The seed blocks are then transferred to a first group of the buoyant pallets in which all or a selected portion of the punch-out plugs have been removed. After growth to a second predetermined stage the plants are transferred to an additional group of pallets in which other selected ones of the punch-out plugs have been removed, in the manner previously described. This procedure may be repeated one or more additional times, as appropriate for the particular crop in question, until the plants reach a mature stage ready for harvest.

Other features and advantages of the apparatus and method of the invention will be discussed in connection with the following description of the preferred embodiments in conjunction with the drawings.

DESCRIPTION OF THE PREFERRED EMBODIMENTS

Figure 1:
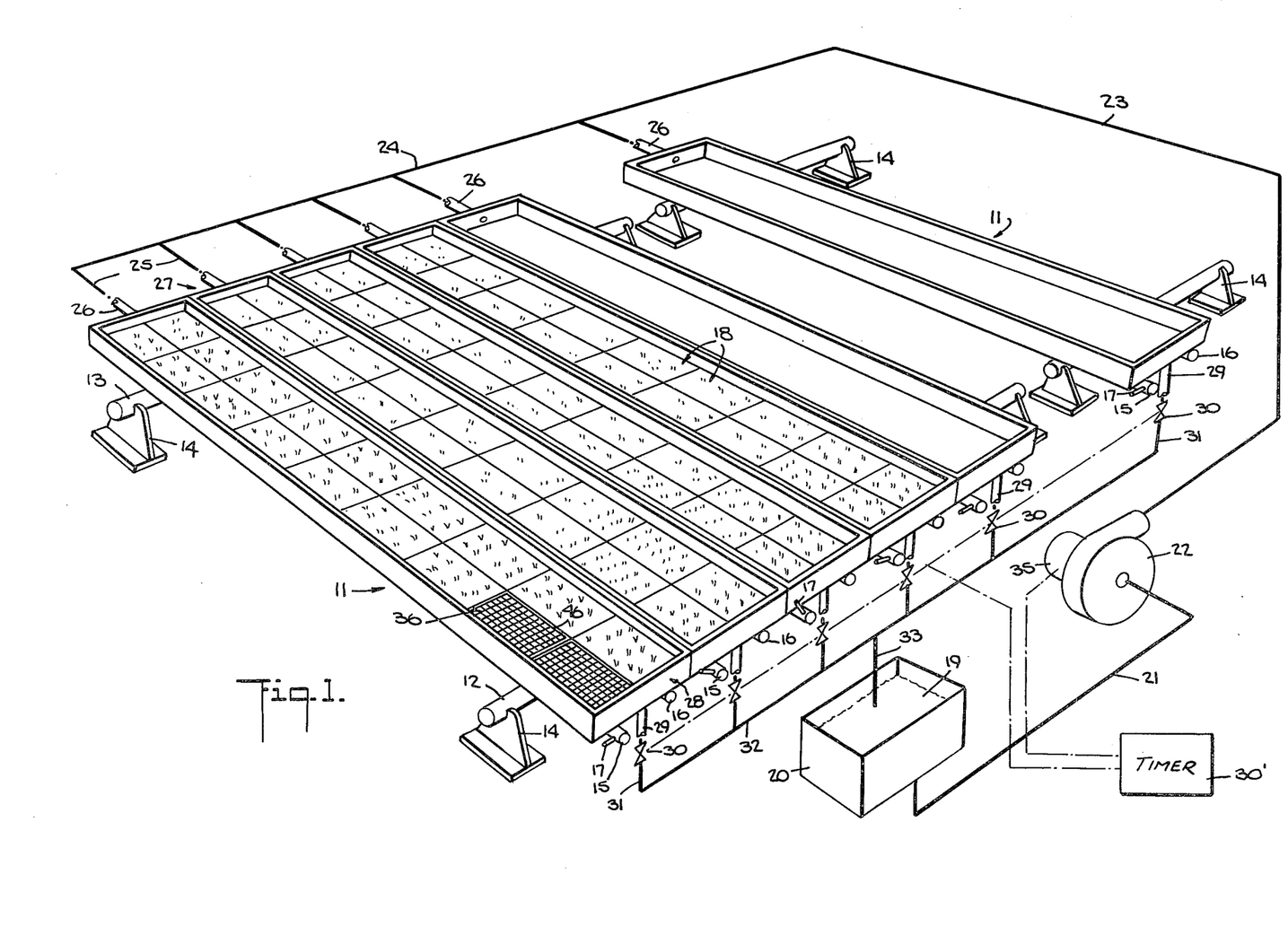
FIG. 1 is a partially schematic perspective view of a hydroponic growing system according to the invention.

With reference to FIG. 1, a preferred embodiment of the system of the invention, particularly suitable for indoor cultivation, includes a number of shallow containers in the form of elongated rectangular troughs 11 placed side by side. The troughs are supported at convenient working height, preferably by means that permit translatory movement of each trough in a direction perpendicular to its longitudinal axis. A simple and effective support structure for each trough includes a set of at least two elongated horizontal members such as cylindrical pipes 12 and 13 which rest on suitable foundation members 14 and extend transversely under the trough. The ends of the set of pipes 12, 13 for one trough are spaced longitudinally from the ends of the corresponding set for the adajcent trough to provide aisle space for access without having to climb over the pipes. Pipes 12 and 13 serve as rails for a pair of rollers 15 and 16 placed longitudinally under each trough 11 and resting across the pipes 12 and 13. At least one of each pair of rollers may have a wheel or lever 17 fastened near one end to facilitate rotation of the roller, and thus obtain lateral shifting of the corresponding trough. The rollers 15 and 16 may also be cylindrical pipes like the support rails 12 and 13.

This support arrangement allows the troughs to be placed immediately adjacent to each other from one side of the array to the other, except for the equivalent of one aisle space between troughs. By shifting the troughs on their respective rollers, aisle space can be obtained between any two adjacent troughs to provide access to plants in these troughs. This is particularly advantageous for indoor facilities (i.e., controlled environment growth rooms) using artificial light, since it maximizes space utilization under the lights.

The invention provides a buoyant structure 18 for supporting plants growing in the troughs. Preferred embodiments of this structure will be described in detail in connection with FIGS. 2-5. Each trough 11 contains a full complement of support structures 18 which fit loosely within the trough, so that they can float on the surface of liquid nutrient 19 supplied from a reservoir 20 through a supply line 21, pump 22, line 23, header 24, and individual branch lines 25 to inlets 26 at one end 27 of the troughs. The branch lines should be made of flexible tubing to accommodate lateral movement of the troughs. Alternatively, separate reservoirs, pumps, and lines can be used with each trough to permit greater experimental or operational flexibility.

At the other end 28 of the troughs, outlets 29 connect through drain valves 30, branch lines 31 (also of flexible tubing), header 32 and return line 33 to the reservoir 20. Each drain valve 30 may be manually operated, but preferably these are solenoid or other automatically actuated valves controlled by a preset timer 30'.

Motor 35 of the pump 22 preferably also is controlled by timer 301. A preferred automatic cycle is to actuate the pump, with the drain valves shut, for a period long enough to pump enough liquid nutrient to the troughs to float the pallets. This assures a proper supply of nutrient to all the plants. After a predetermined feeding period, which may be about 15 minutes, the drain valves are automatically opened to return the liquid nutrient to the reservoir. If desired, the valves may be dispensed with if the drain openings are appropriately sized so that the troughs will not overfill with the pump running continuously during the entire feeding period. The troughs remain empty for a predetermined further period, typically about 1 to 2 hours, at which time the filling cycle is repeated. During the empty period the plant roots, while remaining moist and protected from light by the pallets, are exposed to air in a manner explained below, thereby supplying necessary oxygen without the need to specially aerate the liquid nutrient.

Figures 2, 3:
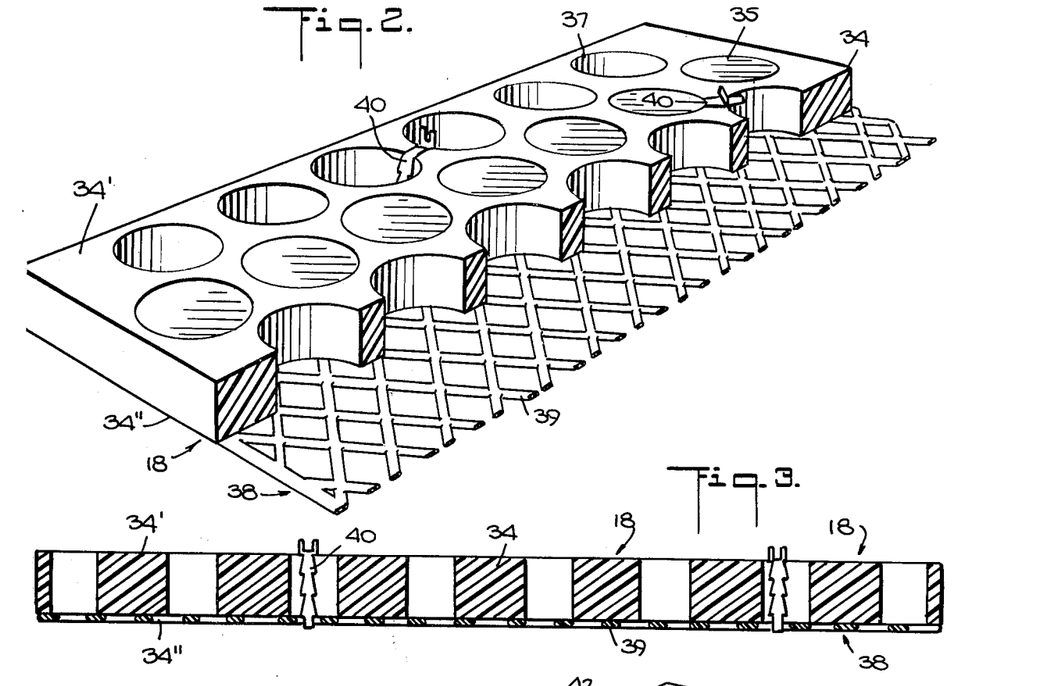
FIG. 2 is a cutaway perspective view of a buoyant plant support pallet of the invention.
FIG. 3 is an elevation view in section of the buoyant pallet of FIG. 2.

One style of buoyant support structure 18 is illustrated in FIGS. 2 and 3. This style is preferred for plants at early growth stages. The support structure 18 includes a buoyant, preferably rectangular, panel or pallet 34 with a top surface 34' and a bottom surface 34", the pallet having punch-out plugs 35 arranged in an array of rows.

Although the pallet can be made of any material light enough to float on water and strong enough to be carried like a tray with a full load of plants, a particularly preferred material is a closed cell foamed plastic such as polyethylene. Very satisfactory results have been obtained with a closed cell foamed panel of 100 percent polyethylene material sold by Dow Chemical Company under the registered trademark "Ethafoam" at a strength grade designated "220 Weight." This material is very light yet strong and resilient, so that the pallets can be reused for a large number of successive crops. Furthermore, its naturally bright white color reflects light incident upon it back upwards against the plant leaf canopies, thus increasing the growth rate of the plants. At the same time, this material is sufficiently opaque to substantially block light rays from penetrating through the pallet and either damaging plant roots or promoting undesired growth of algae in the nutrient solution.

The punch-out plugs preferably are integrally formed from the material of the pallet. Preferably all the plugs in the pallet are formed in a single die-cutting operation by using a press plate as large as the pallet and having a number of cutters equal to the desired number of plugs and arranged in a predetermined plug pattern. The plugs should be spaced as closely as required for the first phase of plant growth, consistent with maintaining sufficient strength in the remaining material of the pallet. Maximum density of the plugs can be achieved if the plugs are arranged in alternately staggered rows, as shown.

The size of each plug is determined by the size of a conventional seed block 36 (see FIG. 8) intended for insertion in each hole 37 in the pallet resulting when the corresponding punch-out plug is removed. For example, a typical seed block is approximately 38 mm (1½ inch) high and 25 mm (1 inch) on a side, and the corresponding plug is a cylinder having a diameter of approximately 44 mm (1¾ inch). If desired, the plugs may have a square or other polygonal cross section, so long as adequate clearance is allowed for the seed block. The thickness of the pallet must be adequate to maintain sufficient stiffness for easy handling, without extending significantly above the top surface of the seed block. A pallet thickness of approximately 35 mm (1⅜ inch) has proven appropriate for use with seed blocks 38 mm (1½ inch) high.

To prevent the seed block from dropping through the hole when the pallet is either floated or picked up, the support structure includes a retaining or blocking means in the form of a flat grid 38 having criss-cross bars 39 and disposed against the bottom surface of the pallet. The retaining grid, which preferably is made of a molded thermoplastic material, but can also consist of a woven screen or netting, is fastened to the pallet by any suitable means, such as conventional plastic ties 40. Alternatively, staples or other fastening devices may be used, or the grid may have integrally molded barbed pins or hooks positioned for positive engagement with the material of the pallet when the grid is placed against the bottom surface of the pallet.

The grid and fastening means may be made of materials other than plastics, such as metal, but a molded thermoplastic material is preferred as being relatively light yet strong and noncorrodable and nonleaching in the wet growing environment of the system.

Figures 4, 5:
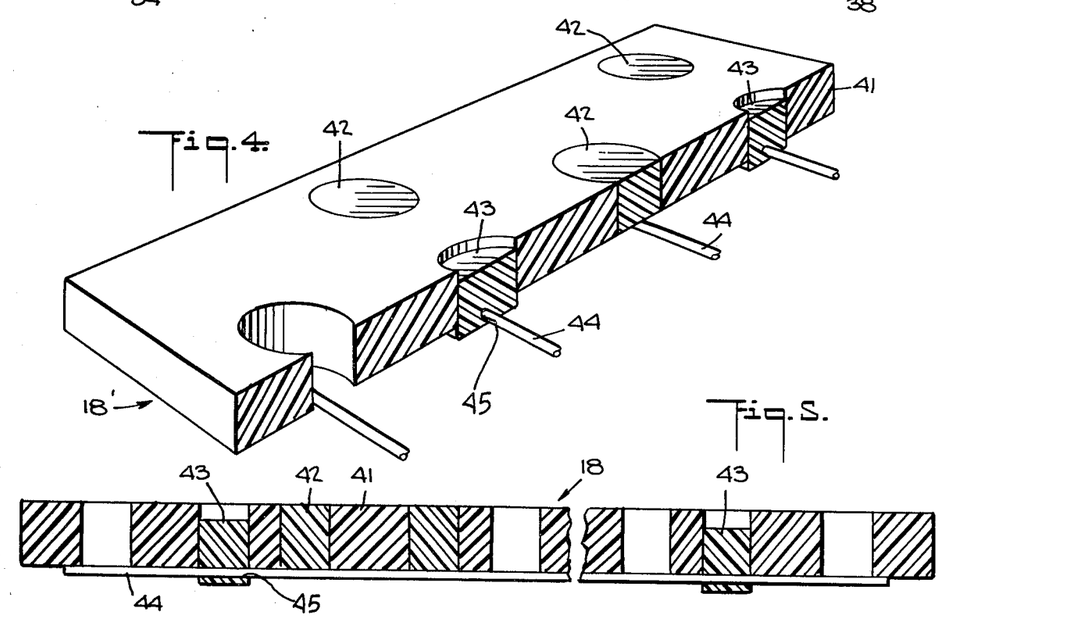
FIG. 4 is a cutaway perspective view of an alternative embodiment of a buoyant support pallet according to the invention.
FIG. 5 is an elevation view in section of the buoyant support pallet of FIG. 4.

FIGS. 4 and 5 illustrate a slightly different plant support structure 18' which is adapted for larger plants requiring greater spacing between plant holes. Structure 18' includes a buoyant pallet 41 having an array of primary punch-out plugs 42 evenly spaced in a predetermined pattern of alternately staggered rows. The plug size for this style of pallet would ordinarily be the same as for the style of FIGS. 2 and 3 because the same size seed block is to be used, except in the case of crops whose root development has reached a stage requiring a larger hole for easy insertion of the plants. Since the required spacing for the more mature plants is greater, however, there is room in the remaining pallet surface for at least two auxiliary punch-out plugs 43 between primary plugs in each row. The auxiliary plugs are used as integral fastening means for the blocking or retaining means in the form of elongated members such as rods 44, which preferably are made of an extruded acrylic plastic material. Each auxiliary plug is provided with a diametral hole 45 adjacent to the bottom end of the plug, and the plugs are pushed partly out of the bottom surface of the pallet to expose the holes 45. A rod 44 is inserted through the auxiliary plugs in each row, and then the plugs are pushed back up into the pallet to press the rod against the bottom surface of the pallet. The result is a simple, light-weight, economical, and effective retainer for a seed block inserted into each hole 42 resulting from removal of a primary punch-out plug, that at the same time spaces the pallet up off the surface on which it rests to provide room for full root development and to permit penetration of air to the roots between feeding cycles.

Of course, the same retainer arrangement can be used with the pallet style of FIGS. 2 and 3 by selecting some of the plugs 35 in each row to perform the function of the auxiliary plugs 43 of the alternative embodiment of FIGS. 4 and 5.

The method of using the buoyant pallets illustrated in FIGS. 2-5 in the system of FIG. 1 is as follows. Plants, such as lettuce, are started by inserting a single seed into each seed block in the conventional way. Desirably, the seed blocks 36 are closely packed into plastic trays 46, which may then be placed into one of the nutrient troughs, as shown in FIG. 1. The trays 46, which are commercially available (as are the seed blocks), have slotted perforations which allow liquid nutrient to reach all the seed blocks to keep them properly moistened during seed germination.

Figure 6A:
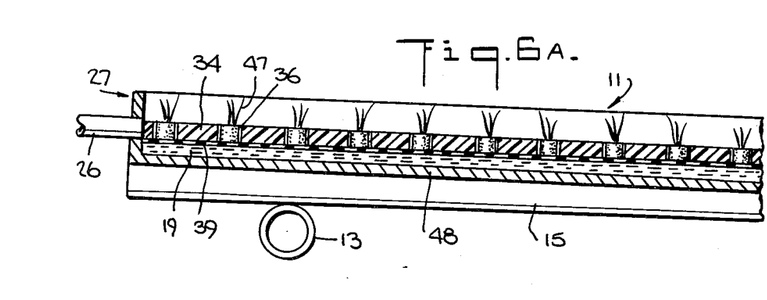
FIG. 6A is an elevation view in section of one end of an elongated shallow nutrient trough of FIG. 1 containing buoyant plant support pallets floating in nutrient solution.
Figures 6B, 8:
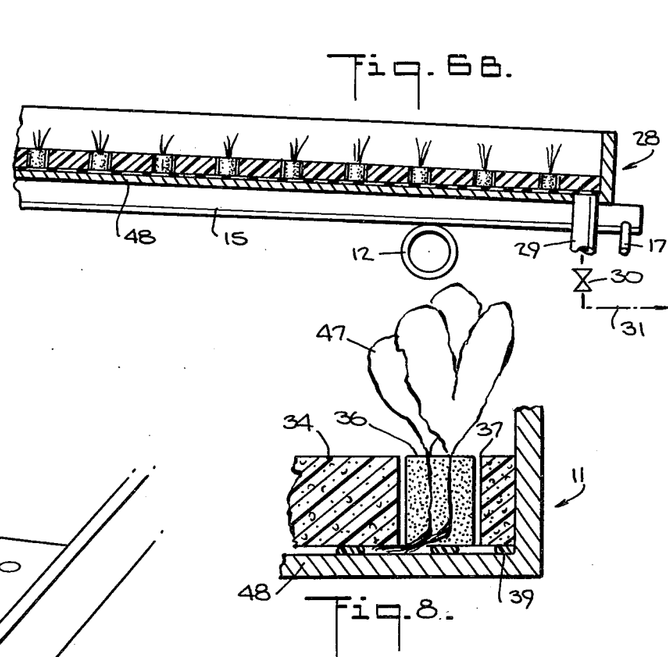
FIG. 6B is an elevation view in section of the other end of the elongated shallow nutrient trough of FIG. 6A with no liquid nutrient in the trough.
FIG. 8 is an enlarged elevation view in section of part of a buoyant support pallet showing a plant growing in a seed block inserted in one of the punch-out plug holes of the pallet.

When the plants reach the seedling stage, they are ready to be transferred to the buoyant pallets. At this growth stage, all of the punch-out plugs will typically be removed from an appropriate number of pallets 18, and a seedling 47 in its seed block 36 will be placed in each resulting hole 37, as shown in FIG. 8. The seed blocks should fit loosely in the holes, so they can easily be removed at a later growth stage without harming the plants. At the same time, they should fit snugly enough to be supported by the walls of the holes and to minimize light leakage to the liquid nutrient solution.

Figure 7:
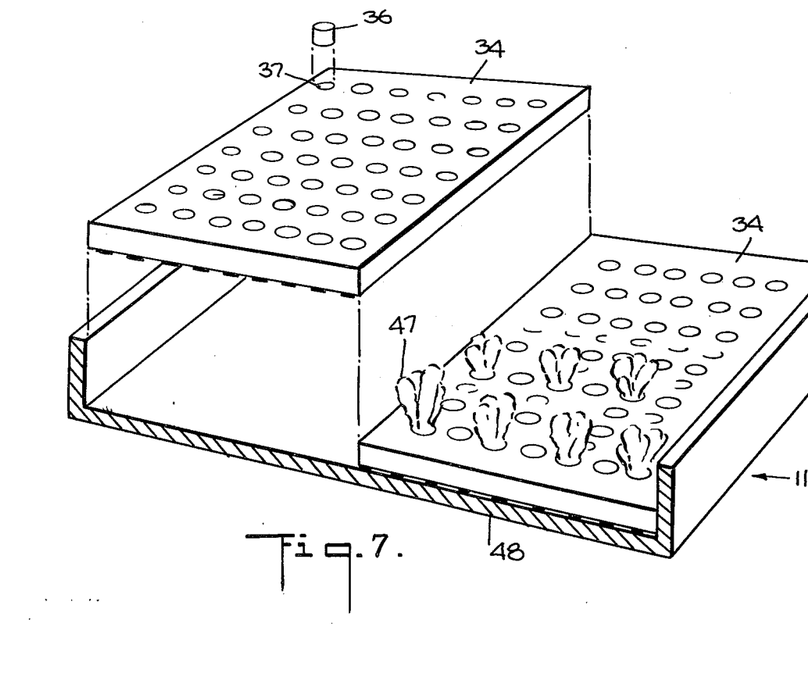
FIG. 7 is a cutaway perspective view of a nutrient trough showing the positioning of support pallets in the trough and the removal of a punch-out plug.

The pallets filled with seedlings are then placed in a nutrient trough, as shown in FIG. 7 (only some seedlings are shown, for clarity). After the trough is filled with pallets, liquid nutrient 19 is pumped in through inlet 26 until all the pallets are floating, as shown in FIG. 6A. Preferably, the level of support pipe 13 is higher than that of support pipe 12, so that the trough has a slight pitch from the inlet end to the outlet end to facilitate draining. After the liquid is drained, following completion of the nutrient feeding cycle, the plant support structures rest on the bottom 48 of the trough with the bottom surface of each pallet spaced above the trough by the thickness of the bars 39 of the blocking grid 38, as shown in FIG. 6B. In this phase air can reach the roots of the plants, as described earlier.

Figure 9:
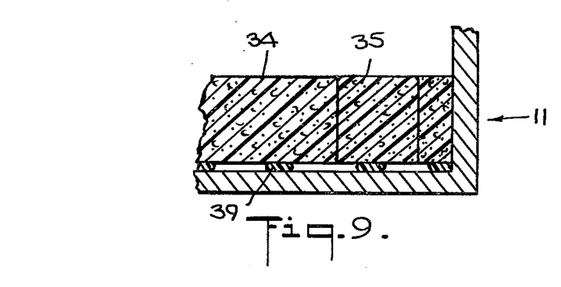
FIG. 9 is a view corresponding to FIG. 8 with the plant removed and a punch-out plug replaced in the hole.

When the plants grow to a size at which crowding occurs, intermediate plants can be removed and the empty holes reclosed with punch-out plugs, as shown in FIG. 9, unless the empty holes are adequately shaded by adjacent plant leaf canopies. Alternatively, all the plants at the second stage can be removed from the first group of pallets and placed in a second group from which only alternate plugs have been removed. A new batch of seedlings can then be placed in the first group of pallets.

When the plants reach still a third growth stage, they can be transferred to the second type of pallet 18' illustrated in FIGS. 4 and 5, in which they can grow to full maturity.

From the foregoing description, it is apparent that the buoyant plant support pallet of the present invention provides the basis for an economical and efficient hydroponic growing system and method well suited to continuous commercial production of plants such as lettuce.

In particular, the buoyant pallet plant growing system of the invention combines the following features and advantages, among others:

(1) A structure that positions growing plants precisely in a variety of preselected spacings. The precision of predetermined fixed spacings is an important feature. Especially when plants are spaced relatively closely, minor unevennesses in spacing lead to uneven growth and loss of marketable plants. However, with pallets of the present invention, even inexperienced workers are able to transfer and respace plants rapidly and precisely. In effect, the removal of a preselected pattern of plugs produces a template that eliminates the need for judgment and skill in spacing plants. The spacing varies by steps, not continuously, but allows as many steps as are likely to be economically justifiable in all but the most elaborate systems, without the complexity and expense of the mechanisms necessary for continuously variable spacing.

(2) An efficient materials handling device for moving large numbers of plants at one time. Although plants are inserted into and removed from the pallets one at a time, once loaded a pallet becomes a compact, safe, convenient, and lightweight means for moving groups of plants from trough to work table for respacing and from final trough to shipping area for harvesting and packaging.

(3) A structure that provides physical support for holding individual plants upright in seed blocks. The holes in the pallets have a supporting as well as a positioning function, so that plants remain stably upright when carried in the pallets and when resting in the troughs, regardless of nutrient flow, air movement, jostling of pallets, and so forth.

(4) A structure that functions as a depth of irrigation regulator. By its buoyancy, the pallet provides a fixed level of wetting of the seed blocks independent of the depth of nutrient solution. Because larger heavier plants are spaced further apart, the total weight of plants carried by the pallet does not change enough to alter significantly the nutrient level with respect to the seed blocks.

(5) A structure that insures adequate oxygenation of plant roots. The open spaces between the cubical seed blocks and the cylindrical holes combine with the spacing between pallet and trough provided by the blocking grids or rods to provide a path for air flow around the plant roots during periods when the nutrient solution is drained from the troughs.

(6) A structure that functions as a substantially light-tight cover. Either by replacing plugs in unused holes or by punching out plugs in different preselected patterns for different stages of growth, the pallets allow direct light transmission only through the small spaces around each seed block, and these spaces are usually well shielded by the plant leaf canopies. The growing trough dimensions are basically integral multiples of individual pallet dimensions (plus allowance for relative movement between pallets and the walls of the trough), so little light penetrates between adjacent pallets. Yet pallets can be easily removed from or replaced in the trough.

(7) A structure that serves as a light reflector. The brilliant white color of the preferred foamed polyethylene material of the pallets makes the best possible use of available light. It is possible, however, to obtain this material in a black form, making it more opaque to light rays. Since the pigment used is not approved by the FDA, black pallets might not be suitable for food crops.

We claim:

1. A support structure for the hydroponic cultivation of plants, the support structure comprising:
a lightweight, buoyant, panel-like pallet adapted to support regularly spaced arrays of plants at predetermined spacings corresponding to advancing growth stages, the pallet including an array of integral punch-out plugs formed from the material of the pallet and arranged in a multiplicity of equally spaced rows, the cross-sectional size of the plugs being predetermined to permit easy insertion and withdrawal of seed blocks into and from holes in the pallet which result from removal of the plugs, whereby selected plugs of the array, spaced apart according to the size of plants at a given growth stage, can be removed for insertion of such plants into the resulting holes.

2. A buoyant plant support structure according to claim 1 wherein the pallet is made of white closed-cell foamed plastic material, and means positioned adjacent to the bottom face of the pallet for partially blocking at least one punch-out plug to prevent the passage of a seed block from the hole remaining after removal of said plug, while permitting free access by roots of a plant in such a seed block to liquid nutrient contacting said bottom face of said pallet.

3. A buoyant plant support structure according to claim 1 or claim 2 wherein the plugs are equally spaced in each row, and the plugs in each row are staggered with respect to the plugs in the next adjacent row.

4. A buoyant plant support structure according to claim 1 wherein said blocking means comprises an elongated member having a diameter substantially smaller than the diameter of the punch-out plugs and having a length extending the full distance of one of said rows of plugs, together with means for attaching said member adjacent to the bottom surface of the pallet in line with said one row of plugs.

5. A buoyant plant support structure according to claim 4 wherein said elongated member comprises an acrylic rod.

6. A buoyant plant support structure according to claim 4 wherein the means for attaching the elongated member comprises at least one integral punch-out plug, said plug having a transverse hole extending therethrough adjacent to one end thereof, the plug being shifted in the pallet to expose said hole beyond the bottom surface of the pallet, and the elongated member being inserted through the transverse hole in the plug.

7. A buoyant plant support structure according to claim 6 wherein said at least one integral punch-out plug for attaching the elongated member comprises two plugs in each row of punch-out plugs in said array of punch-out plugs.

8. A buoyant plant support structure according to claim 1 wherein said blocking means comprises an open mesh grid member fastened against the bottom surface of the pallet, the size of said grid member being large enough to cover the array of punch-out plugs.

9. A buoyant plant support structure according to claim 8 wherein the grid structure is made of molded plastic material.

10. A hydroponic growing system comprising:
at least one shallow container;
at least one buoyant panel-like plant support pallet of closed-cell foamed plastic material disposed in the container, the at least one pallet fitting loosely within the container to cover substantially the entire area thereof and having an array of integral punch-out plugs formed from the material of the pallet, the plugs being disposed in spaced relation in a multiplicity of rows, and selected ones of the plugs being removed to permit insertion of plants at a given growth stage in the resulting holes;
means for supplying fresh liquid nutrient solution to the container in an amount to float said at least one pallet; and
means for draining liquid nutrient from the container, and means positioned adjacent to the bottom face of the pallet for partially blocking at least one punch-out plug to prevent the passage of a seed block from the hole remaining after removal of said plug, while permitting free access by roots of a plant in such a seed block to liquid nutrient contacting said bottom face of said pallet.

11. A hydroponic growing system according to claim 10 wherein the at least one container comprises a plurality of flat-bottomed, elongated, rectangular troughs arranged side by side, and the system further comprises means for supporting each trough for horizontal translatory movement in a direction perpendicular to its longitudinal axis to provide access space between adjacent troughs.

12. A hydroponic growing system according to claim 11 wherein the means for supporting each trough comprises at least two horizontal spaced apart elongated support members extending transversely under each trough and a pair of spaced apart cylindrical rollers positioned under each trough on said support members, said rollers extending parallel to the longitudinal axis of the trough.

13. A hydroponic growing system according to claim 12 wherein the elongated support members are cylindrical in cross section, whereby the rollers make substantially point contact with the support members for minimum rolling friction.

14. A hydroponic growing system according to claim 12 or 13 further comprising means attached adjacent to one end of one of each pair of said rollers to facilitate the translatory movement of the respective trough.

15. A hydroponic growing system according to claim 10 wherein the means for supplying fresh liquid nutrient solution includes a reservoir containing nutrient solution and a pump connected between the reservoir and the container for delivering solution from the reservoir to the container, and the system further includes a timer for periodically actuating the pump to deliver liquid nutrient to the container according to a predetermined schedule.

16. A method for hydroponic cultivation of plants comprising:

placing a seed in each one of a multiplicity of closely-packed seed blocks;

supplying liquid nutrient at least periodically to the blocks for germinating the seeds during a first period until the seedlings reach a predetermined growth stage;

removing a selected number of punch-out plugs in a pattern of predetermined spacing from an array of such plugs in each of a number of buoyant plant support pallets;

transferring each seedling in its seed block to one of the holes in the pallets resulting from the removal of a corresponding punch-out plug such that every hole contains a plant;

placing a sufficient number of the pallets in a shallow container to fit loosely without jamming yet substantially covering the bottom area of the container; and filling the container with sufficient liquid nutrient to float the pallets, whereby the plant roots are provided with proper nutrient levels and the nutrient solution and plant roots are screened by the pallets from direct exposure to light.

17. A method for hydroponic cultivation of plants according to claim 16 further comprising repeatedly draining and subsequently replenishing the supply of liquid nutrient in the container at predetermined intermittent intervals so that the plant roots are alternately covered by liquid nutrient solution and exposed to the atmosphere, thereby supplying necessary oxygen to the plant roots.

18. A method for hydroponic cultivation of plants according to claim 16 or 17 further comprising transferring part of the plants after they reach a later predetermined growth stage from each pallet to an additional pallet having punch-out plugs removed in a pattern of greater spacing than said first mentioned pattern.

19. A method for hydroponic cultivation of plants according to claim 18 and further comprising replacing punch-out plugs in the holes of the pallets from which the plants were removed.

* * * * *

UNITED STATES PATENT AND TRADEMARK OFFICE
CERTIFICATE OF CORRECTION

PATENT NO. : 4,312,152
DATED : January 26, 1982
INVENTOR(S) : Daniel DRURY et al.

It is certified that error appears in the above—identified patent and that said Letters Patent is hereby corrected as shown below:

Column 5, line 6: change "adajcent" to --adjacent--.

Column 5, line 47: change "301" to --30'--.

Column 9, line 47: after "holes" insert --, and means positioned adjacent to the bottom face of the pallet for partially blocking at least one punch-out plug to prevent the passage of a seed block from the hole remaining after removal of said plug, while permitting free access by roots of a plant in such seed block to liquid nutrient contacting said bottom face of said pallet--.

Column 9, lines 50-56: delete ", and means ... said pallet".

Signed and Sealed this

Eighteenth Day of May 1982

[SEAL]

Attest:

GERALD J. MOSSINGHOFF

Attesting Officer

Commissioner of Patents and Trademarks